US008250972B2

(12) United States Patent
Santoiemmo

(10) Patent No.: US 8,250,972 B2
(45) Date of Patent: Aug. 28, 2012

(54) SELECT SERVING AND FLAVORED SPARKLING BEVERAGE MAKER

(75) Inventor: Carl Santoiemmo, Willoughby Hills, OH (US)

(73) Assignee: Primo Products, LLC, Winston-Salem, NC (US)

( * ) Notice: Subject to any disclaimer, the term of this patent is extended or adjusted under 35 U.S.C. 154(b) by 288 days.

(21) Appl. No.: 12/594,678

(22) PCT Filed: May 5, 2008

(86) PCT No.: PCT/US2008/062653
§ 371 (c)(1),
(2), (4) Date: Oct. 5, 2009

(87) PCT Pub. No.: WO2008/124851
PCT Pub. Date: Oct. 16, 2008

(65) Prior Publication Data

US 2010/0139496 A1 Jun. 10, 2010

Related U.S. Application Data

(60) Provisional application No. 60/927,329, filed on May 4, 2007.

(51) Int. Cl.
*A47J 31/00* (2006.01)

(52) U.S. Cl. ............. 99/323.2; 99/284; 99/290; 99/295; 426/477; 261/DIG. 7

(58) Field of Classification Search ................. 99/323.2, 99/323.1, 284, 290, 295; 426/477; 261/DIG. 7
See application file for complete search history.

(56) References Cited

U.S. PATENT DOCUMENTS

| | | | | |
|---|---|---|---|---|
| 3,596,588 | A | 8/1971 | Moss | |
| 3,628,444 | A * | 12/1971 | Mazza | 99/275 |
| 4,355,735 | A | 10/1982 | Whorton, III et al. | |
| 4,520,950 | A | 6/1985 | Jeans | |
| 4,793,513 | A | 12/1988 | Verheijen | |
| 4,815,366 | A | 3/1989 | Hauslein | |
| 4,836,414 | A | 6/1989 | Credle, Jr. et al. | |
| 4,919,041 | A * | 4/1990 | Miller | 99/279 |
| 4,944,217 | A | 7/1990 | Watanabe | |
| 5,008,013 | A | 4/1991 | Favre et al. | |
| 5,063,836 | A | 11/1991 | Patel | |
| 5,071,594 | A | 12/1991 | Borland et al. | |
| 5,071,595 | A | 12/1991 | Burrows | |

(Continued)

FOREIGN PATENT DOCUMENTS

WO WO 2005/060801 A1 7/2005

(Continued)

OTHER PUBLICATIONS

International Search Report and Written Opinion for International Application No. PCT/US2008/062653, mailed Aug. 14, 2008.

(Continued)

*Primary Examiner* — Reginald L Alexander
(74) *Attorney, Agent, or Firm* — Alston & Bird LLP

(57) ABSTRACT

The present invention relates generally to method and a device to make a single or a multiple serving of a select flavored, carbonated beverage. The instant abstract is neither intended to define the invention disclosed in this specification nor intended to limit the scope of the invention in any way.

17 Claims, 7 Drawing Sheets

U.S. PATENT DOCUMENTS 5,111,740 A 5/1992 Klein
5,124,088 A 6/1992 Stumphauzer
5,188,019 A 2/1993 Vahabpour
5,195,422 A 3/1993 Newnan
5,260,081 A 11/1993 Stumphauzer et al.
5,285,718 A * 2/1994 Webster et al. ................. 99/290
5,295,611 A 3/1994 Simard
5,325,765 A 7/1994 Sylvan et al.
5,460,846 A 10/1995 Stumphauzer et al.
5,794,519 A 8/1998 Fischer
5,840,189 A 11/1998 Sylvan et al.
5,870,944 A 2/1999 Vander Zalm et al.
5,875,703 A 3/1999 Rolfes
D408,679 S 4/1999 Potts et al.
5,901,635 A 5/1999 Lucas et al.
5,918,768 A 7/1999 Ford
5,975,365 A * 11/1999 Hsieh ......................... 222/129.4
6,068,875 A 5/2000 Miller et al.
6,079,315 A 6/2000 Beaulieu et al.
6,082,247 A 7/2000 Beaulicu
6,142,063 A 11/2000 Beaulieu et al.
6,182,554 B1 2/2001 Beaulieu et al.
6,305,267 B1 10/2001 Rolfes
D452,433 S 12/2001 Lazaris
D452,434 S 12/2001 Sweeney
6,370,884 B1 * 4/2002 Kelada ........................... 62/3.64
D461,358 S 8/2002 Cahen
6,440,256 B1 8/2002 Gordon et al.
D462,865 S 9/2002 Honan et al.
D474,110 S 5/2003 Sweeney
D474,111 S 5/2003 Lazaris
6,589,577 B2 7/2003 Lazaris et al.
6,606,938 B2 8/2003 Taylor
6,607,762 B2 8/2003 Lazaris et al.
6,645,537 B2 11/2003 Sweeney et al.
6,655,260 B2 12/2003 Lazaris et al.
6,658,989 B2 12/2003 Sweeney et al.
6,666,130 B2 12/2003 Taylor et al.
6,672,200 B2 1/2004 Duffy et al.
6,698,332 B2 3/2004 Kollep et al.
6,708,600 B2 3/2004 Winkler et al.
6,712,342 B2 * 3/2004 Bosko ........................... 261/127
D489,215 S 5/2004 Honan et al.
6,742,772 B2 6/2004 Kiefer
6,752,069 B1 6/2004 Burke et al.
D492,878 S 7/2004 Nakato et al.
6,820,535 B2 11/2004 Fischer
6,843,164 B2 1/2005 Drobeck
6,857,353 B2 2/2005 Kollep et al.
D502,362 S 3/2005 Lazaris et al.
6,941,856 B2 9/2005 Font et al.
6,955,116 B2 10/2005 Hale
6,974,052 B1 12/2005 d'Hond et al.
D513,572 S 1/2006 Schaffeld et al.
6,990,391 B1 1/2006 Cunha et al.
7,017,735 B2 3/2006 Carlson
7,021,197 B2 4/2006 Chen et al.
7,126,479 B2 10/2006 Claessens et al.
7,165,488 B2 1/2007 Bragg et al.
D544,299 S 6/2007 Schaffeld et al.
D559,611 S 1/2008 Cheong
7,331,483 B2 2/2008 Bhimani et al.
7,347,138 B2 3/2008 Bragg et al.
7,360,418 B2 4/2008 Pelovitz
7,377,162 B2 5/2008 Lazaris
D570,637 S 6/2008 Glucksman et al.
7,398,726 B2 7/2008 Streeter et al.
D582,714 S 12/2008 Hensel
7,472,643 B2 1/2009 Mitchell et al.
7,513,192 B2 4/2009 Sullivan et al.
7,523,695 B2 4/2009 Streeter et al.
7,552,672 B2 6/2009 Schmed
D597,366 S 8/2009 Drake et al.
D604,985 S 12/2009 Taylor et al.
D607,258 S 1/2010 De Pra'
D607,259 S 1/2010 De Pra'
7,640,845 B2 1/2010 Woodnorth et al.
7,677,158 B2 3/2010 McDuffie et al.
D622,999 S 9/2010 Marauyou et al.
7,798,054 B2 9/2010 Evers et al.
D626,368 S 11/2010 De Pra'
D630,881 S 1/2011 Rezzonico
D634,963 S 3/2011 Romandy
8,033,211 B2 * 10/2011 Halliday et al. ................ 99/295
2004/0112222 A1 6/2004 Fischer
2004/0134357 A1 7/2004 Cai
2005/0087255 A1 4/2005 Humphrey et al.
2005/0287251 A1 12/2005 Lazaris et al.
2006/0016347 A1 * 1/2006 Girard et al. .................... 99/295
2006/0090653 A1 5/2006 McDuffie et al.
2006/0112831 A1 * 6/2006 Greenwald et al. ............. 99/275
2006/0174773 A1 8/2006 Taylor
2006/0288776 A1 12/2006 Pelovitz
2006/0288777 A1 12/2006 Lazaris
2006/0292012 A1 12/2006 Brudevold et al.
2007/0056994 A1 3/2007 Woodnorth et al.
2007/0081367 A1 4/2007 Hammond
2007/0175334 A1 8/2007 Halliday et al.
2007/0203587 A1 8/2007 Erlandsson et al.
2007/0215239 A1 9/2007 Dorney
2007/0221066 A1 9/2007 Sullivan et al.
2008/0095904 A1 4/2008 Sullivan et al.
2008/0115674 A1 5/2008 Huang et al.
2008/0116262 A1 5/2008 Majer
2008/0134902 A1 6/2008 Zimmerman et al.
2010/0024658 A1 2/2010 Jacobs et al.
2010/0037779 A1 2/2010 Pecci et al.
2010/0107887 A1 * 5/2010 Bentley et al. .................. 99/288
2010/0156614 A1 6/2010 Adstedt et al.
2010/0251901 A1 10/2010 Santoiemmo
2010/0303964 A1 12/2010 Beaulieu et al.
2010/0326283 A1 12/2010 Evers et al.

FOREIGN PATENT DOCUMENTS

WO WO 2005/079361 A2 9/2005
WO WO 2008/124851 A1 10/2008
WO WO 2010/064228 A1 6/2010

OTHER PUBLICATIONS

Keurig B140 & 200 Single-Cup Brewers; Green Mountain Coffee Roasters; p/n. 67159; Jul. 2007; B140-200; 2 pages.
Office Action for U.S. Appl. No. 12/573,507 dated Oct. 19, 2011.
Notice of Allowance for U.S. Appl. No. 29/369,100 dated Jun. 9, 2011.
Combined Search and Examination Report for Application No. GB 1115093.5 dated Dec. 23, 2011.

* cited by examiner

SELECT SERVING AND FLAVORED SPARKLING BEVERAGE MAKER

RELATED APPLICATIONS

The present invention claims the benefit of U.S. Provisional Patent No. 60/927,329 filed on May 4, 2007 and incorporated by reference herein as if rewritten in its entirety. In that the descriptions of specific embodiments in the '329 provisional application were presented for purposes of illustration and description under 35 U.S.C. 112, 1st paragraph, and claims were not required, those claims previously provided were not intended to be exhaustive nor to limit the invention Therefore, the scope of the present invention is in no way to be limited only by the claims previously provided as exemplary, nor by any possible, adverse inference under the rulings of Warner-Jenkinson Company, v. Hilton Davis Chemical, 520 US 17 (1997) or Festo Corp. V. Shoketsu Kinzoku Kogyo Kabushiki Co., 535 U.S. 722 (2002), or other similar case law or subsequent precedent should not be made by changes from such claims subsequent to this Provisional Patent Application.

BACKGROUND OF THE INVENTION

1. Field of the Invention

The present invention relates generally to method and a device to make a single or a multiple serving of a select flavored, carbonated beverage.

2. Description of the Related Art

A well known soda dispenser utilizes a large tank of carbon dioxide ("$CO_2$") to carbonate a number of individual fountain beverages. The $CO_2$ is simultaneously added to both a branded soda-syrup and water dispensed from a spigot. Recipes for varied flavors are accomplished afterwards, wherein the bottled or the poured beverage is flavored by means of a sugared syrup.

Existing carbonating devices introduce $CO_2$ into a one liter or two liter bottle of water or juice by means of a single, one use cartridge or a larger cylinder for multiple engagements of $CO_2$. A flavor can be added after the liquid is carbonated. The contents are poured into a glass or drunk from the liter bottles.

These devices cannot make multiple beverage types at the same time.

The consumer demands a healthy alternative to those sugary soft drinks and is willing to pay for the convenience of having a beverage that's healthy, portion controlled (single-serving glass) to avoid unnecessary waste with continual freshness, always cooled, made to one's specific taste by regulating and controlling the beverage temperature, carbonation level, type of beverage, and specific flavor and amount of flavor. These consumer demands are seen in parallel to the coffee consumer. They have demanded and now have coffee makers that make a single-serving cup, always fresh and have the ability to customize the individual's taste my controlling the strength of the flavor and type of flavor and type of beverage, e.g.: regular coffee, cappuccino, lattes, etc. On demand, continual freshness with a push of a button. Now the soft drink, sparkling flavored water and sparkling juice consumer want the same choices and are willing to pay for those conveniences.

Finally responding to the cries of the consumer that sugary beverages are causing major health problems and the cause of obesity, many school districts across the country are removing these beverages from their premises and only allowing health beverages. In response, beverage companies plan on introducing a beverage that low in sugar and fortified with vitamins and minerals.

An emerging health conscience lifestyle demands flavorful alternatives to sugary soft drinks. Consumers are more attentive to healthy portions and they prefer the convenience of a sparkling, fresh, cool beverage made at home. The present invention teaches a sparkling beverage maker that provides a means to select a flavor, to select an amount of flavor, to control the carbonation level, to control the chilled temperature and to select the type of beverage, e.g., a sparkling water, a sparkling soda or a sparkling juice. The present invention provides a means for a person to repeatedly and to consecutively make a number of different single-serving beverages at home.

SUMMARY OF THE INVENTION

It is an object of the present invention to provide a means to make a single-serving of a carbonated beverage.

It is an object of the present invention that the beverage may be a water, a juice or a soda; however, it is envisioned that the beverage is individually customized to comprise a select amount of a flavor.

It is an object of the present invention to provide a means to control the amounts of sugar, the vitamins and the minerals added to sparkled beverages.

It is an advantage of the foregoing object that the present invention encourages a more healthy diet and lifestyle.

It is an object of the present invention to comprise a means to regulate and to control the beverage temperature.

It is an object of the present invention to provide a means to regulate the level of carbonation.

It is a further object of the present invention to provide a means to regulate and the select the flavor of the sparkling beverage at the time the beverage is dispensed.

It is an advantage of the foregoing means to provide an immediate and a continued freshness to the beverage.

It is another object of the present invention to provide a means to switch between a sparkling fruit juice selection, a healthy soda selection and a sparkling water selection.

It is a final object of the present invention to provide all of the benefits the foregoing objects entail.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

DESCRIPTION OF THE PREFERRED EMBODIMENTS

Figure 1:
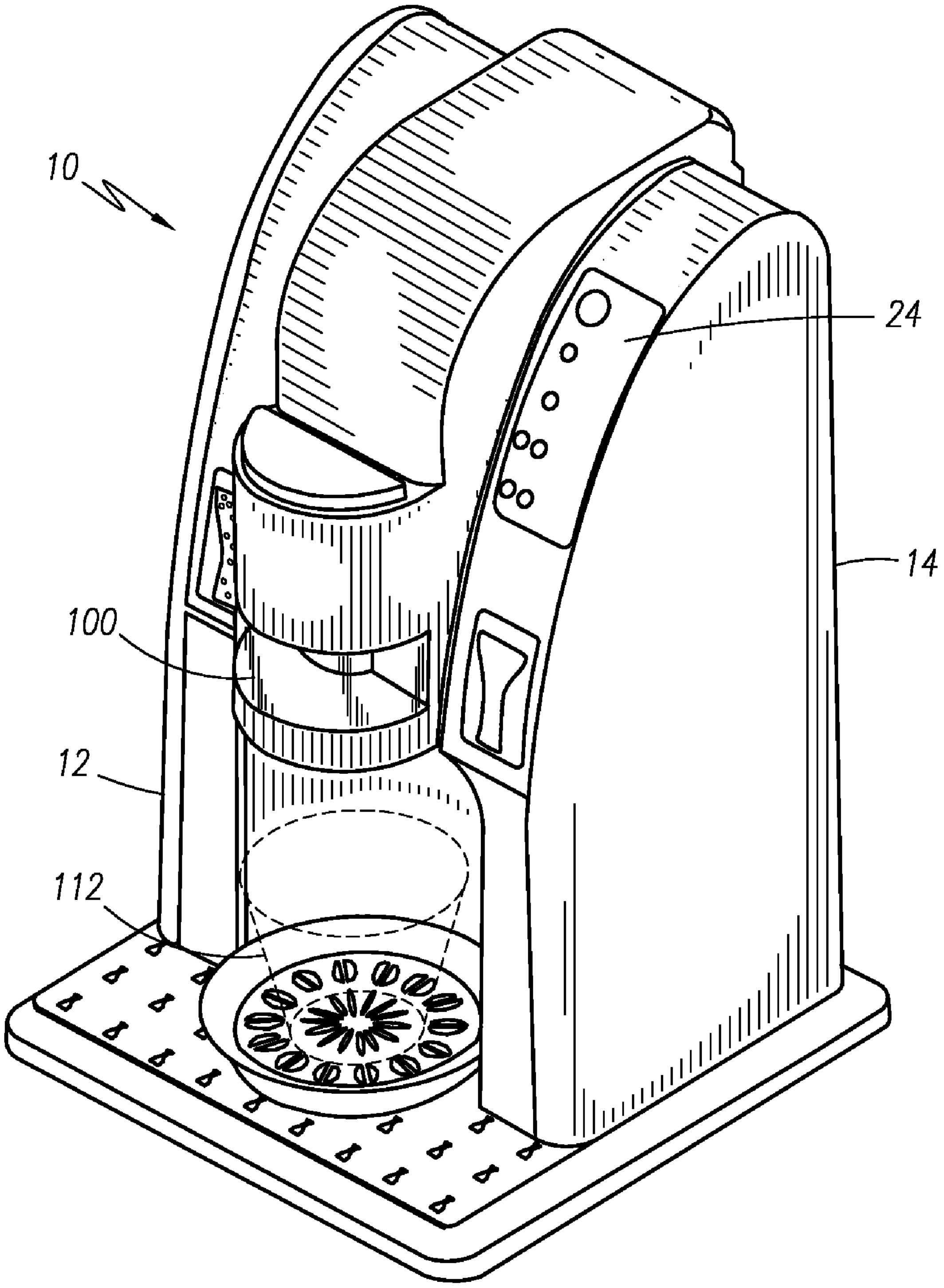
FIG. 1 is a front perspective view of a select serving, flavored and/or sparkling beverage maker according to the preferred embodiment of the present invention.
Figure 2:
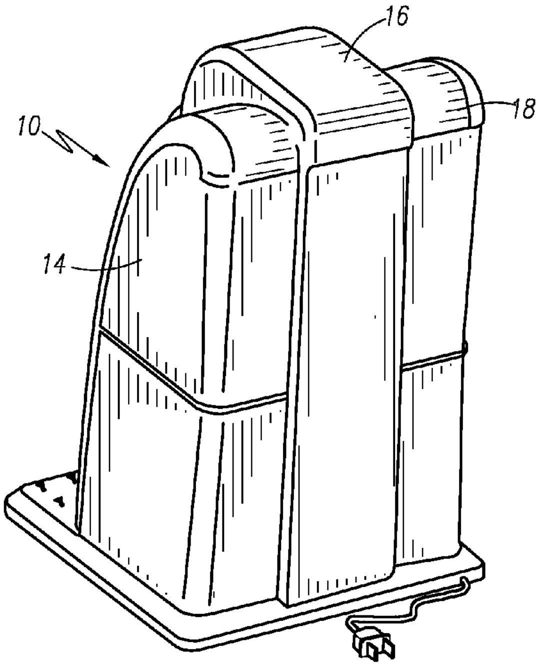
FIG. 2 is a rear perspective view thereof.
Figure 3:
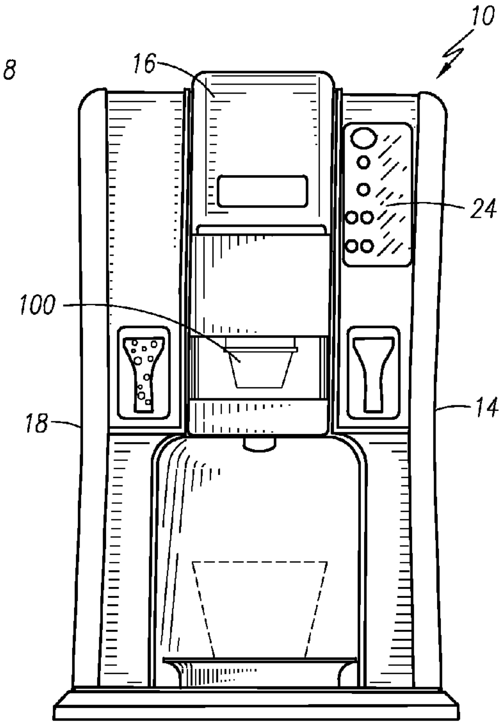
FIG. 3 is a front elevational view thereof.
Figure 4:
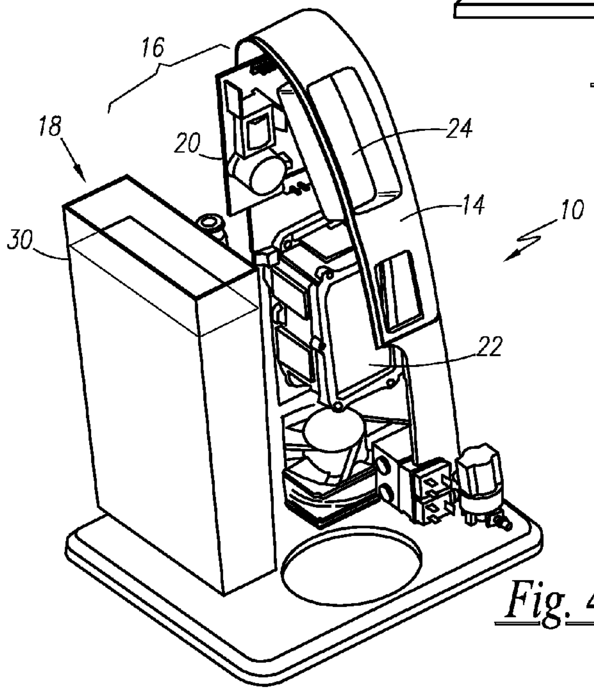
FIG. 4 is a front perspective view thereof shown in a partially exploded view having an outer housing 12 removed.

The best mode for carrying out the invention is presented in terms of its preferred embodiment, herein depicted within the Figures. As described below, a preferred embodiment, as anticipated at the time of filing, is identified and described as exemplary of the teachings of the present invention. However, the disclosure is not intended to be narrowly construed by this exemplary embodiment, as one skilled in the art would know that the operational and functional equivalent of many of the components, systems, steps and processes taught herein could be modified or replaced by equivalent components, systems, steps and processes and still remain within the spirit and teachings of the present invention.

1. Detailed Description of the Figures

A preferred embodiment of a select serving, flavored and/or sparkling beverage maker, hereinafter referred to generally as a sparkling beverage maker 10, is shown in FIG. 1-8. Both the front portion 12 is segmented generally into a control area 14, a mixing area 16, and a filling area 18. The control area 14 houses the carbonator 20, the chiller 22, and the operational control unit 24 which houses a Central Processing Unit, the operation of which is described in greater detail below. The mixing area 16 provides for the mixing of flavors, water, and carbonation, the operation of which is also described in greater detail below. The filling area 18 incorporates the water reservoir 30 and pumps to provide beverage mixing water for the creation of carbonated and non-carbonated, chilled flavored beverages.

Figure 5:
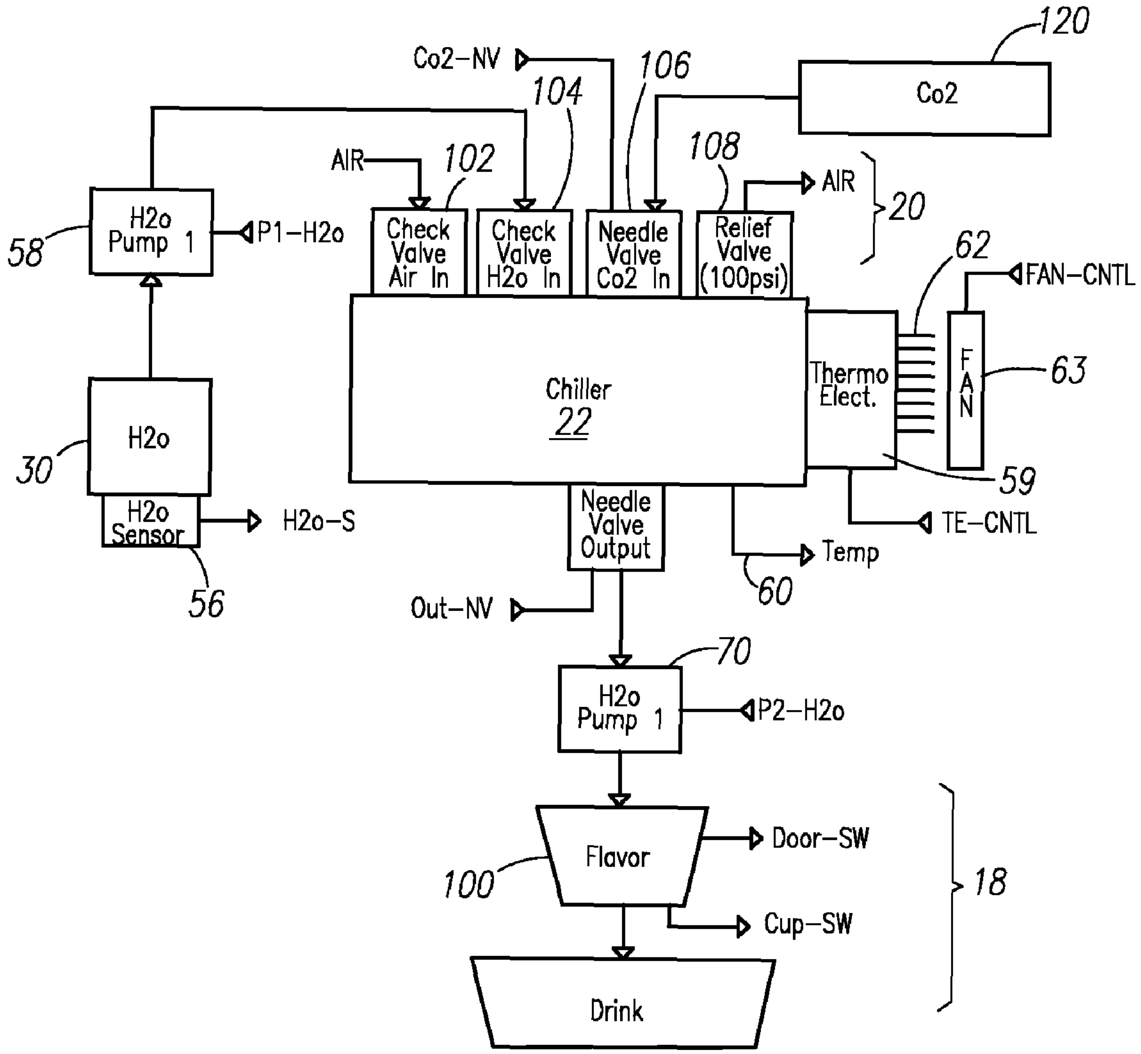
FIG. 5 is a block diagram of the operational schematic for use therewith.
Figure 6A:
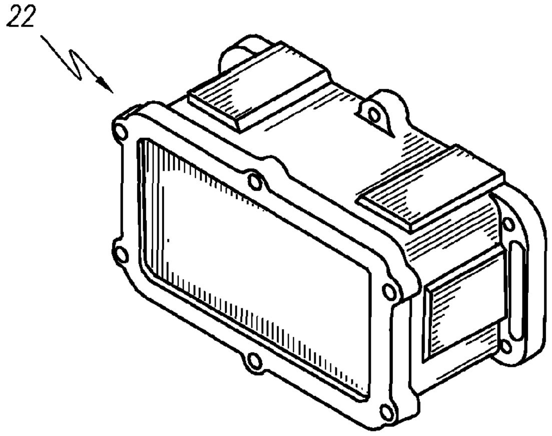
FIG. 6*a* through 6*d* are perspective, elevational, and plan views of a chiller unit 22 for use therein.
Figure 6B:
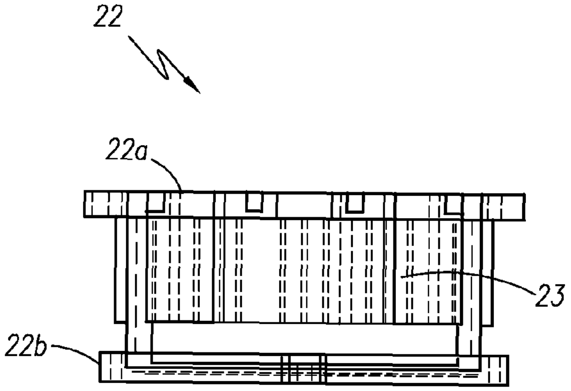
Figure 6C:
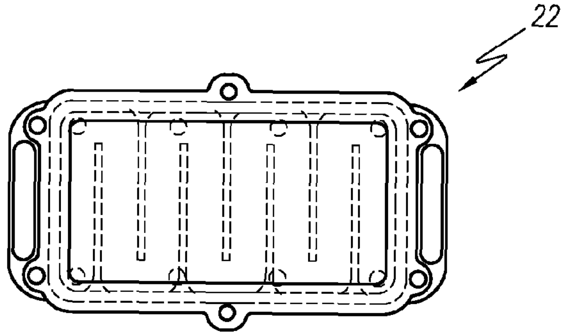
Figure 6D:
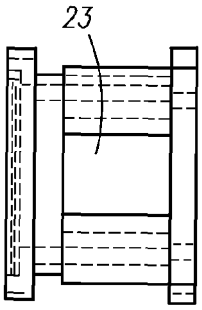
Figure 7:
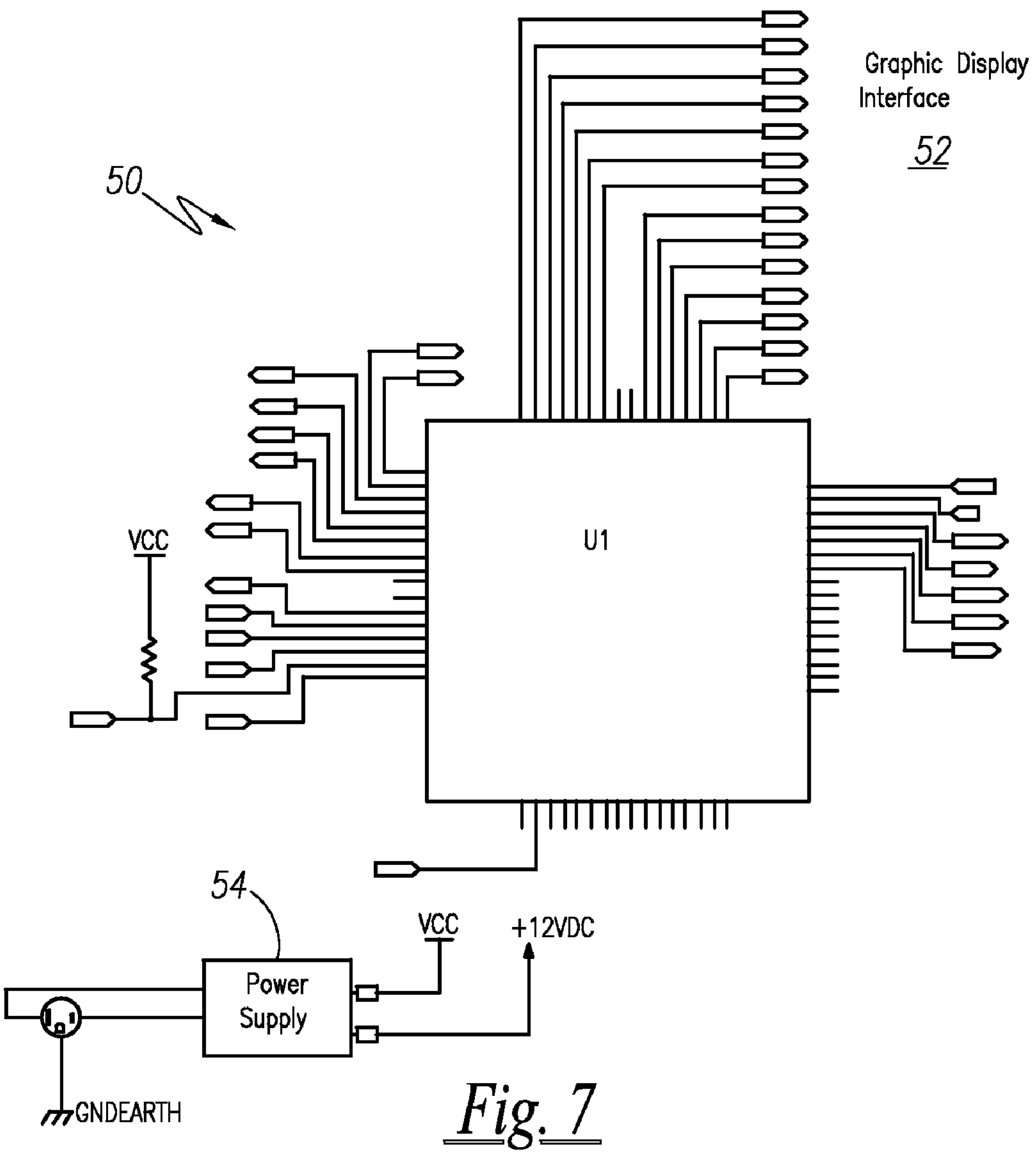
FIG. 7 is a schematic drawing of a Central Processor Unit 50 for use therewith.
Figure 8:
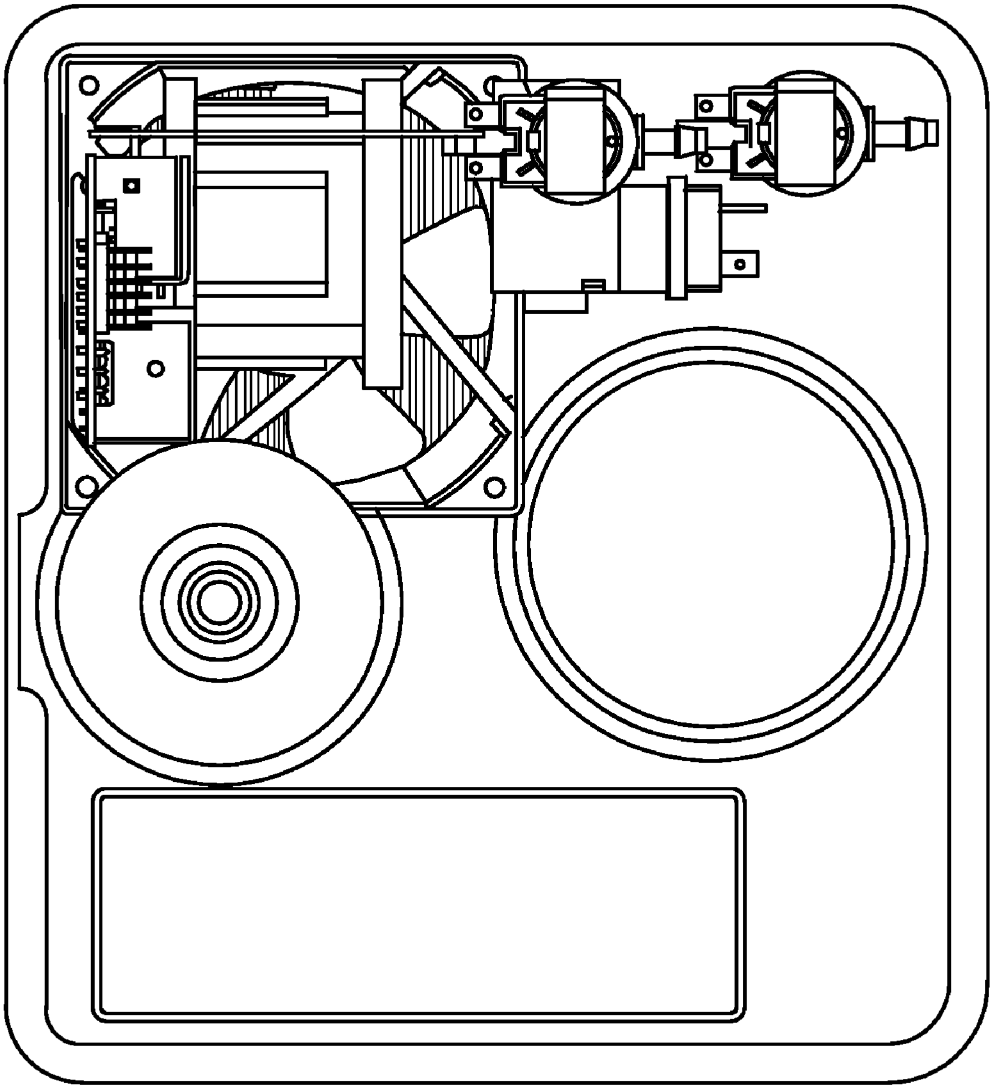
FIG. 8 is a cut away top plan view of a select serving, flavored and/or sparkling beverage maker according to the preferred embodiment of the present invention.

In conjunction with FIGS. 5 and 7, the sparkling beverage maker 10 incorporates the Central Processing Unit, or CPU 50 for operationally controlling all of the internal controls. When the beverage maker 10 is activated, a user interface displaced on the operational control unit 24 will indicate status, cycle step and operation by use of illuminated LED driven directly from the internal power supply 54. Immediately afer power is applied the unit senses the present of the water within the water reservoir 30 through a water level sensor 56. In the enclosed example shown for purpose of enabling a preferred embodiment, the water reservoir 30 is anticipated as having a 64 ounce capacity and can be capable of containing a replaceable filter through which water will communicate. The use of a translucent chamber wall will allow for visual inspection of the remaining water capacity. The water level will be sensed in order to manage the fill/dispensing operations property, as disclosed below.

While a number of sensors are equivalent, a float sensor 56 will trip if the water level gets too low or the chamber is removed. Alternately or additionally, an infra red LED and IR sensitive transistor can also form a sensing function for the present of a properly seated reservoir containing liquid.

A first water pump 58 is used to move water from the reservoir 30 to the chiller 22. Under direct control of the CPU 50, the volume of water to be moved can be controlled as variable, or can be implemented as a constant volume feed for each cycle. Pumped to the chiller 22, the chiller 22 incorporates a thermoelectric cooler 59 that is used to chill the water to the prescribed temperature. Temperature is sensed by a positive temperature coefficient resistor 60 bonded to the chiller. As shown in conjunction with FIG. 6*a* through 6*d*, the chiller 22 utilizes a chiller box 22*a* forming an operative chilling volume 23 sealed by a chiller lid 22*b* such that the operative chilling volume 23 corresponds to a cycle volume for each chilled (or heated) beverage. As can be seen by one skilled in the art, the present teachings are similarly capable of chilling or heating the beverage through the use of a thermoelectric heat transfer unit. For use in cooling, a heat sink 62 on the 'hot' side allows fresh air to be forced across by a fan 63 under the control o the CPU 50. The fan 63 under control of the CPU, can be cycled on an off during operation.

A second water pump 70 is used to dispense the contents of the chiller through a flavor cup 100 as described in greater detail below. Dispensed under pressure, this second water pump 70 is operated after the chiller 22 is filled, reaches temperate, and is carbonated if so selected. This pump 70 will run slightly longer than necessary in order to fully dispense and purge the chiller 22, flavor cup 100 and all communicated operative plumbing.

2. Operational Overview

A select serving, flavored and/or sparkling beverage maker 10 of the present invention is a new appliance that that creates a new product category in the home appliance industry. Including the capacity for custom formulations of flavor for single cup/glass on demand dispensing, the dispenser 10 will incorporate a $CO_2$ gas cylinder for selectively carbonating each beverage. To accomplish this, several features are anticipate. These include the following.

An air inlet check valve or chiller vent 102 must close to allow $CO_2$ to be injected to the chiller during carbonation, and open under negative pressure from the second water pump 70 to allow air into the chamber 23 to allow the chiller contents to be pumped through the flavor cup 100 and eventually into the user's drinking container 112.

A water inlet check valve 102 is opened under positive pressure from the first water pump 58 to allow water to enter the chiller 22 from the water reservoir 30. When this pump is off, the valve 102 automatically closes to allow $CO_2$ to be injected into the chiller 22.

A $CO_2$ needle valve 106, functioning as carbonation control means, allows $CO_2$ to enter the chiller 22 and carbonate the water prior to dispensing through the flavor cup 100. This feature is optional and is a function of a front panel control selection to the CPU. If carbonation is selected, the chiller 22 will be filled with water, less the volume of the flavor cup 100, and then the water check valve 104 closed. $CO_2$ is optionally injected into the chiller, causing carbonation. This action may be delayed if the water temperature in the chiller has not reached the appropriate temperature.

A relief valve 108 is shown as a safety precaution against over-pressurizing the chiller form the $CO_2$ source.

An output needle valve 112 is desired to resist CO, injection pressure during carbonation. It is opened under CPI control to allow dispensing, and closed during carbonation.

Finally, a $CO_2$ Chamber 120 is required as a replaceable, disposable supply of carbonating gas. While various available or proprietary supplies are envisioned, the present invention in its preferred embodiment anticipates adapting to use commercially available chambers of a standard size that have been popularized by paint ball enthusiast. Such chambers are easy to acquire and already comprise a commercial infrastructure for economically efficient refilling.

3. Flavor Cups

Figure 9A:
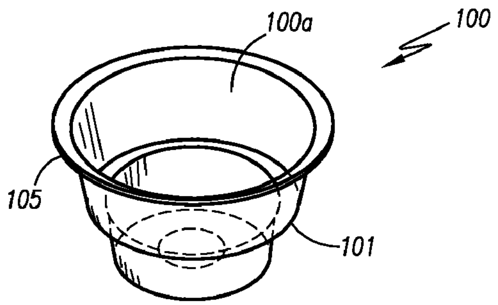
FIG. 9*a* through 9*c* are perspective, top plan and side elevational views, respectively, of a flavor cup 100 for use therewith is shown.
Figure 9B:
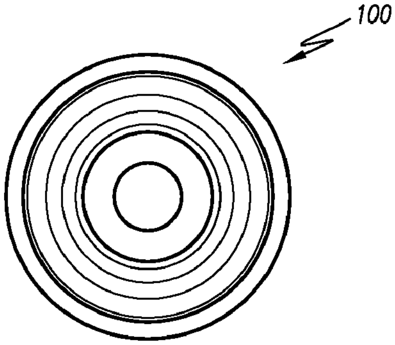
Figure 9C:
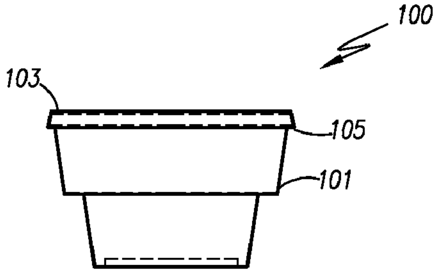

As shown in FIG. 9*a* through 9*c*, the use of individually packed, single use disposable flavor cups 100 are anticipated which include a mixing area 100*a* of a volume greater than the volume that will be filled with the flavors of choice to make sparkling flavored water and a syrup to make vitamin fortified and mineral added, low sugar soda pop. By way of example, in the preferred embodiment a flavor cup 100 would have a capacity of slightly more than 1 oz, but will be filled with 1 oz. syrup flavor concentrate having a custom vacuum formed design to incorporate a indexing ridge 101, a sealed foil cover 103 covers and seals the flavor cup 100. When placed in the mixing chamber 12, the foil 103 is pierced on the top and, in doing so, will allow the cup to move downward and be pierced a second time from the bottom. An upper peripheral flange 105 therein support the cup. When the piercing needle approaches from the top of the cup, it will be engaged and sealed about its perimeter by the foil and around the piercing cite. The flavor cup 100 thereafter functions as a mixing chamber for carbonated or noncarbonated chilled water and flavor syrup.

4. Operation of the Preferred Embodiment

The present invention provides a novel means to make a customized single-serving of chilled, sparkling beverage at home. A complete line of home, office and commercial appliances will have the basic attributes of a Sparkling Beverage Maker that will:

- Give the consumer the ability to make on demand his/her choice of beverage in a single-service glass either a sparkling water with or without flavor, a sparkling fruit juice or an enhance soft drink, low in sugar with vitamins and minerals.
- Give the consumer to ability to regulate and control the beverage temperature.
- Give the consumer the ability to regulate the level of carbonation from low, medium and high.
- Give the consumer the ability to choose and regulate the flavor of sparkling water as the dispensing takes place for a continual and immediate freshness.
- Gives the consumer the ability to switch over to making a sparkling fruit juice.
- Gives the consumer the ability to switch over to making a healthy soda pop.
- Gives the consumer the luxury of benefitting from these single-serving glasses, on-demand, at a push of a button freshness, eliminating waste due to loss of carbonation going flat at a fraction of the cost of store-bought beverages.

The foregoing descriptions of specific embodiments of the present invention have been presented for the purposes of illustration and description. They are neither intended to be exhaustive nor to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and the various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A beverage maker capable of making customized beverages, said beverage maker comprises:

- a water source configured to provide water;
- a chiller in fluid communication with the water source and configured to receive a selected volume of water, wherein the chiller is configured to modify the temperature of the selected volume to a prescribed temperature;
- a carbon dioxide source in fluid communication with the chiller and configured to provide carbon dioxide to the chiller;
- a single use disposable flavor cup containing a flavor and having a sealed cover that covers and seals said flavor cup;
- a water injection nozzle configured to access said flavor cup, wherein the water injection nozzle is in fluid communication with the chiller and is configured to operatively charge said flavor cup with the selected volume of the chiller so as to mix the selected volume with the flavor within the flavor cup to form a single-serving, on-demand volume of a flavored beverage; and
- a discharge port for dispensing the flavored beverage from said flavor cup.

2. The beverage maker of claim 1, wherein said flavor cup contains a selected flavored syrup.

3. The beverage maker of claim 2, wherein said syrup is fortified with at least one of vitamins, herbs, or minerals.

4. The beverage maker of claim 1 further comprising operative controls for selectively engaging said carbon dioxide source as desired.

5. The beverage maker of claim 1, wherein said flavor cup functions as a mixing chamber for the selected volume from the chiller and the flavor.

6. The beverage maker of claim 5, wherein the flavored beverage is fully mixed within the flavor cup.

7. The beverage maker of claim 1 further comprising a temperature sensor configured to measure the temperature of the selected volume within the chiller.

8. The beverage maker of claim 1 further comprising a user interface configured to indicate status of the customized beverage.

9. The beverage maker of claim 1, wherein the chiller defines an operative volume that corresponds to a cycle volume for each beverage.

10. The beverage maker of claim 1, wherein the chiller comprises a thermoelectric cooler.

11. The beverage maker of claim 1 further comprising a water level sensor configured to measure the level of water within the water source.

12. A method for making a customized beverages in a beverage maker, the method comprising:

- receiving a single use disposable flavor cup containing a flavor, wherein the flavor cup comprises a seal that covers and seals the flavor cup;
- providing a selected volume of water to a chiller from a water source;
- modifying the temperature of the selected volume within the chiller to a prescribed temperature;
- providing carbon dioxide to the selected volume within chiller;
- projecting a water injection nozzle through the seal of the flavor cup;
- operatively charging said flavor cup with the selected volume of the chiller so as to mix the selected volume with the flavor within the flavor cup to form a single-serving, on-demand volume of a flavored beverage; and
- dispensing said flavored beverage from the flavor cup.

13. The method of claim 12, wherein providing carbon dioxide to the selected volume within the chiller comprises selectively engaging a carbon dioxide source to provide a selected amount of carbon dioxide to the selected volume within the chiller.

14. The method of claim 12, wherein operatively charging the flavor cup with the selected volume of the chiller comprises fully mixing the flavored beverage within the flavor cup.

15. The method of claim 12 further comprising sensing the temperature of selected volume within the chiller.

16. The method of claim 12 further comprising indicating the status of the customized beverage on a user interface.

17. The method of claim 12 further comprising sensing the level of water within the water source.

* * * * *